United States Patent [19]

Speer

[11] Patent Number: 4,948,443

[45] Date of Patent: Aug. 14, 1990

[54] PLASTIC LAMINATE REPAIR

[76] Inventor: Lawrence Speer, 16678 Chibiabos Trail, Doylestown, Ohio 44230

[21] Appl. No.: 314,187

[22] Filed: Feb. 22, 1989

[51] Int. Cl.$^5$ .............................................. B32B 35/00
[52] U.S. Cl. ....................................... 156/94; 156/98; 156/278; 156/280; 156/281; 264/36; 427/140; 428/63
[58] Field of Search .................... 156/94, 98, 278, 280, 156/281; 264/36; 427/140; 428/63

[56] References Cited

U.S. PATENT DOCUMENTS

| | | | |
|---|---|---|---|
| 4,133,913 | 1/1979 | Moore | 427/140 |
| 4,181,547 | 1/1980 | Speer | 156/94 X |
| 4,419,162 | 12/1983 | Fischer | 156/94 |

*Primary Examiner*—Robert A. Dawson
*Attorney, Agent, or Firm*—D. Peter Hochberg; Mark Kusner; Louis J. Weisz

[57] ABSTRACT

A process for repairing plastic laminates comprising cleaning the damaged areas and filling the same with a suitably colored patch material. Preferably the patch material comprises a mixture of an aqueous dispersion of a vinyl acetate homopolymer with an aqueous dispersion of a vinly acetate/acrylic copolymer, together with a color pigment, and a filler. Desirable additonal ingredients to the patch material include an aqueous polyurethane dispersion and a thickening agent. An initial foundation base layer comprising an epoxy material may be applied to the damaged area before the patch material is applied. After drying and smoothing, the surface of the patch may be decorated with a design to match the undamaged area, and a clear coat of polyurethane is applied to the patch.

10 Claims, 1 Drawing Sheet

PLASTIC LAMINATE REPAIR

TECHNICAL FIELD

This invention relates to the repair of plastic laminates, and to kits for repairing such laminates. More particularly, this invention relates to the repair of surface imperfections which detrimentally affect the appearance of plastic laminates such as those common employed, for example, in covering table and counter tops. Specifically, this invention relates to unique combinations of materials, including certain paste and putty-like materials that harden following their application to provide a durable repair which closely resembles the area of the laminates repaired.

BACKGROUND OF THE INVENTION

Sheets of plastic laminates, for instance, those formed by the high-pressure lamination of sheets of melamine and phenolic plastics, have long been used for decorative application through bonding to a variety of surfaces. Such laminates are not only decorative, but easy to maintain; consequently, they have found wide application in homes, schools, offices, and similar areas, not only for use in connection with table and counter tops, but for the manufacture of a variety of furniture, as well as for other applications in which hard plastic surfaces are required. While plastic laminates continue to enjoy wide popularity for reasons including those mentioned in the foregoing, they are relatively expensive materials, entailing considerable installation costs. Furthermore, although the laminates are hard, durable structures, relatively resistant to accidental damage, they are somewhat brittle, and occasionally display a tendency to chip, to develop edge cracks, and to otherwise experience marring damage. In such instances, because of the relatively high cost of replacement, and since matching the laminate material is often hard to obtain, it is highly advantageous to be able to repair the laminates, providing that such repairs can be effected in a substantially undetectable manner.

In the past, materials have been developed for filling seams formed between abutting surfaces of the plastic laminates; however, the filling materials have not been sandable, and thus it is not always possible to produce a surface sufficiently smooth to be undetectable from the areas surrounding it. Furthermore, such materials are typically solvent-based, tending to present the drawbacks inherent in the use of substances containing solvents. Other fillers sometimes employed lack a surface sufficiently hard to withstand the physical contacts that the repairs are required to withstand. In addition, it is difficult to provide the color and design of the undamaged surface surrounding the reconstructed area, resulting in a patch area that is undesirably noticeable.

BRIEF DISCLOSURE OF THE INVENTION

In view of the preceding, therefore, it is a first aspect of this invention to provide a composition and method for repairing damaged surfaces of plastic laminates.

A second aspect of this invention is to furnish a way in which to repair damage to plastic laminate surfaces so that the repair is virtually undetectable.

Another aspect of this invention is to provide a method in which non-professionals can achieve professional results in repairing damaged plastic laminates.

Yet another aspect of this invention is to provide a kit that contains components required to repair damaged plastic laminates in a professional manner.

An additional aspect of this invention is to make available a way in which to achieve repairs of plastic laminates that display colors, patterns, and surface finishes closely resembling those of the adjacent, undamaged surface.

A still additional aspect of this invention is to avoid the costly replacement of damaged plastic laminates, and the objects of which such laminates form a part.

A further aspect of this invention is to provide a method for repairing damage to plastic laminates without the use of expensive tooling.

The preceding and other aspects of the invention are provided by a process for restoring plastic laminate structures having unwanted void areas in the surface thereof comprising the steps of:
  cleaning the void areas preparatory to their filling;
  thereafter filling the void areas with patch material; and
  applying protective top coatings to the exposed surface of the fillings,
wherein said cleaning comprises removing any loose and adventitious material from said voids, and
wherein said patch materials comprise (1) a member selected from the group consisting of vinyl acetate/acrylic copolymers, vinyl acetate homopolymers, and mixtures of said vinyl acetate/acrylic copolymers with said vinyl acetate homopolymers, together with (2) inert mineral powders and (3) color pigments; and
wherein further, said top coatings are polyurethane polymers.

The preceding and still other aspects of the invention are provided by a repair kit for restoring plastic laminate structures comprising components including:
  at least one container containing colored patch material:
  at least one container containing a topcoating material;
  a texturing tool;
  restoration instructions;
  applicator implements; and
  a container for holding said components,
wherein said patch material comprises (1) a member selected from the group consisting of aqueous dispersions of vinyl acetate/acrylic copolymers, aqueous dispersions of vinyl acetate homopolymers, and mixtures of aqueous dispersions of vinyl acetate/acrylic copolymers with aqueous dispersions of vinyl acetate homopolymers, together with (2) inert mineral powders, and (3) color pigments; and
wherein said topcoating material is a polyurethane polymer contained in a liquid carrier.

BRIEF DESCRIPTION OF THE DRAWINGS

The invention will be better understood when reference is had to the following drawings in which.

DETAILED DESCRIPTION OF THE INVENTION

Figure 1:
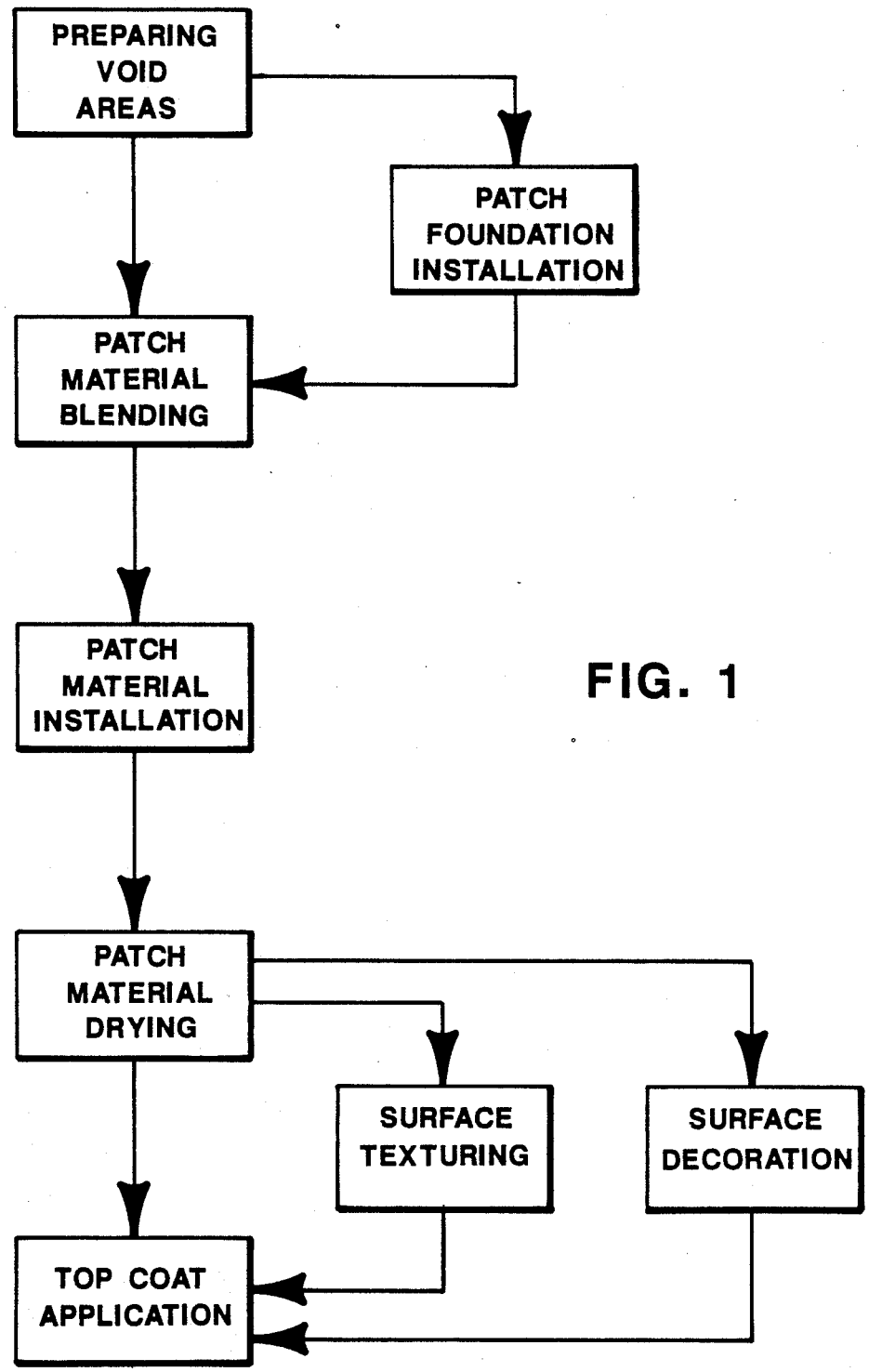
FIG. 1 is a block diagram illustrating the primary steps of restoration of plastic laminates, including optional restoration steps.

The process of restoration is carried out essentially as illustrated in FIG. 1., a block diagram of the primary steps of restoration, which shows some of the optional restoration steps.

Commonly, laminated plastic materials, particularly those formed by the high pressure lamination of melamine and phenolic plastics, while hard, are frequently chipped, the edges crack, and the laminates otherwise experience damage. Plastic laminates of the type to which the restorations described in the invention are directed are marketed, for example, under the trademarks "Formica" brand, "Wilson Art" brand, "Never Mar" brand, and others.

The restoration process contemplated by the invention comprises preparing the damage holes or void areas by cleaning and, in some cases, lightly sanding or otherwise abrading the surface of the areas to remove chips and loose pieces of the laminate. In instances where the damage consists of relatively large, deep holes, it is frequently desirable to install an epoxy base, or foundation material, prior to putting the patch material in place. The patch materials, comprising vinyl acetate/acrylic polymers, vinyl acetate hompolymers, and mixtures of the preceding, together with various inert mineral powders, color pigments, and optionally other ingredients including thickeners and polyurethane, are then blended so that the final patch material exhibits a color and is capable of providing a hardness appropriate for the surface being patched.

The installed patch material is thereafter allowed to solidify, and in those cases where the repaired area is relatively extensive, the surface is lightly abraded until the desired surface texture is obtained. Thereafter, it is sometimes desirable to modify the color of the repaired area, or to provide a decorative design thereon. This is accomplished by reducing patch material of the appropriate color, and applying it to the surface of the patch with a fine brush, a cellular foam implement, other tools, or a combination of them to replicate the color and/or design required.

The final step in the restoration process is the application of a topcoat of polyurethane material that dries to a dull finish, matching the luster of the plastic laminate.

The process of restoration is begun by cleaning the damaged area. Any standard cleaner may be used for the purpose; however, those of the solvent-type, for example, acetone which dries rapidly, are particularly effective for the purpose. After the area of the damage has dried, it is desirable to lightly sand the area to remove any chips or loose pieces of the laminate.

In those instances where the damaged area, involves relatively large, deep surface irregularities it is often desirable to provide a foundation, or base, before proceeding with the patch material. It has been found that the use of epoxy materials such as, bisphenol A catalyzed, for example, with a polymercaptan catalyst, are well suited for the purpose. Such materials commonly will contain fillers, such as powdered limestone, and various adhesion modifiers. A particularly useful form of epoxy resin systems comprises coextruded components in the form of a tape, one component being located in an interior region of the tape, the other comprising the outside of the tape, which can be kneaded together to mix the components, resulting in a curing reaction. One such product is that manufactured under the trademark "Kneadtite" by Polymeric Systems, Inc. of Phoenixville, Pa. Following kneading to mix the interior and exterior components, the product is pressed firmly into the damaged area and allowed to harden, a process taking approximately fifteen minutes. Wood putty or similar materials could also be used to form the foundation base.

Following installation of the base material, or where the damaged area is either too small, or sufficiently shallow to eliminate a need for a base, the patch material is formulated by mixing patch materials of the different colors necessary to approximate the color of the surface being repaired. The patch material comprises vinyl acetate homopolymers, vinyl acetate/acrylic copolymers, and mixtures thereof, if desired, together with thickeners and/or polyurethane materials. While solvent based patch materials can be employed, as previously indicated, solvent systems entail certain disadvantages, and aqueous systems are therefore preferred.

A variety of polyvinyl acetate homopolymers may be successfully used in formulating the patch material of the invention; however, those exhibiting a solubility of at least about 85% by weight in tetrahydrofuran are preferred. An aqueous dispersion containing at least about 55% by weight of the homopolymer, stabilized with a nonionic surfactant, and having a viscosity in the order of 23 centipoise as measured by a Brookfield model LVI viscosimeter operated at 60 rpm with a No. 4 spindle at a temperature of 77° F. is typical of such homopolymers. A polyvinyl acetate emulsion of the type described is that marketed under the trademark "DURACET 110" by Franklin International of Columbus, Ohio.

Copolymers of the type useful in the invention are those of the polyvinyl acetate/acrylic type, particularly those formed from an acrylamide, n-methylol acrylamide producing especially good patch material. The copolymer described will usually have less than 8% by weight acrylamide, and will exhibit insolubility of at least about 60% by weight in tetrahydrofuran at room temperature. A useful polyvinyl acetate/acrylamide material is an aqueous emulsion containing at least about 51% by weight copolymer in water, having a viscosity of about 15 centipoise as measured by the Brookfield viscosimeter procedure described. Such a copolymer, often stabilized with polyvinyl alcohol, is self cross-linking and dries to a relatively hard material. An example of such a product is sold under the name "DURACET 55" by Franklin International.

It has been found that some patches containing a vinyl acetate moiety tend to crack or craze, a tendency thought to be due to an excessively hard structure. In any event, it has been found that when mixtures of vinyl acetate/acrylamide copolymers are mixed with vinyl acetate polymers, the resulting mixture shows little or no tendency to develop such surface imperfections, and such mixtures are, therefore, a preferred embodiment of the invention.

Specifically, it has been found that the hompolymers described should be employed as a mixture with the copolymers disclosed in amounts such that the copolymer constitutes about 50 to 60%, by volume, of the mixture, while the copolymer, constitutes about 40 to 50%, by volume, of the mixture. The ratio may be varied, however, depending upon the nature of the constituents of the mixtures, and the hardness of the patch which it is desired to achieve. Additional polymers may also be added to the patch materials, for example, in the case of aqueous polymer systems, an aqueous dispersion of polyurethane, especially an anionic, aliphatic, polyester polyurethane containing at least about 33% solids in water, about 17% by weight of a methyl pyrrolidone cosolvent, and having a number average molecular weight of from about 30,000 to about 60,000. Typically the viscosity of such a material will be from about 200 to 400 centipoise, as measured by a Brookfield viscosimeter at 77° F., using a No. 2 spindle. One such suitable product is that manufactured by ICI under the trademark "NeoRez R-960". The addition of up to 20% by volume of the polyurethane described confers desirable durability properties to the patch and enhances its adhesion characteristics; consequently, the addition of the polyurethane aqueous dispersion is a preferred embodiment of the invention.

Fillers including inert mineral powders such as, for example, calcium carbonate, barytes, blanc fixe, silicates, slate flower, soft clays, and the like, are added to the aqueous dispersions, thickening them into a paste, and providing reinforcement for the polymeric patches formed. Powdered magnesium silicate hydrate has been found to be particularly well suited for use as a filler material.

Aqueous dispersions of coloring materials, often containing preservatives, biocides, and an antifreeze, will be added to the aqueous dispersions of the patch materials to provide the desired colors. Ordinarily, a number of patch dispersions will be prepared, each having a different color, and mixtures of such dispersions will be compounded to provide a color matching the plastic laminate to be repaired.

Additional compounds that may be added to the patch dispersions include thickening agents, for example, particularly copolymers of acrylic acid and methacrylate, treated with an alkali to produce a salt. Such a material is that sold by Prochem of Greensboro, N.C. under the trademark "CHEMFIX". The addition of such a product to the aqueous patch material dispersion give a longer shelf life, desirably slows drying of the patch, and it provides better adhesion between the patch and the material being repaired.

After the aqueous dispersions of the paste-like patch materials have been combined to achieve the desired color, they are applied to the patch area and allowed to dry. If the damage is deep or large, several layers of filler may be applied and allowed to dry, and in the case of larger, deeper repair areas, several layers of the repair patch are often applied to achieve a level surface. Desirably, particularly in the case of the larger patches, the dried surface is abraded to a smooth finish to match the surrounding areas. Following filling of the damaged areas as described in the preceding, a clear topcoat is applied over the repair. A polyurethane similar or identical to that described in connection with formulation of the patch material is suitable for the purpose. The polyurethane not only provides a clear, protective topcoat, but it tends to dry to a dull finish, matching the lustre of plastic laminates which typically have a rather low finished sheen, or finish. Polyurethane materials suitable for providing the topcoat may be in the form of either an aqueous dispersion, or a solvent solution. Polyurethanes of the type described provide films having the degree of adhesion necessary to provide top coating materials.

In order to make the topcoat film tougher and better able to withstand abrasion, it is oftentimes useful to add a catalyst to the polyurethane to cross-link the composition. Such a cross-linker may take the form of a transition metal salt of a fatty acid, for example, the catalyst sold under the trademark "CX100" by Ferro Corporation of Cleveland, Ohio. The addition of the cross-linker catalyst not only toughens the topcoat film, but also significantly shortens its drying time from the normal two to four hours, to about one hour.

In order to facilitate the repair of damaged plastic laminates by the method of the invention, it has been found desirable to provide the necessary restoration ingredients and tools for applying the same in the form of a kit. Such kit will typically include containers of paste-like patch materials of different colors, for example, red, blue, yellow, green, white and black, an emery board or wet/dry sanding paper for smoothing patched surfaces, a spatula for applying the patching materials, a thin brush and cellular sponge for applying reduced patching material pastes to duplicate surface colors and decorative finishes. The kit will also include a container of polyurethane in a liquid carrier. Where the polyurethane is to be added to a mixture of patch materials in aqueous dispersion, an aqueous dispersion of the polyurethane material will be provided. A container of either an aqueous polyurethane dispersion, or a solvent solution thereof, may be included for application of the clear topcoat. The kit will advantageously also include epoxy tape of the type described. Desirably such components will be packaged, together with instructions, in a suitable container.

While in accordance with the patent statutes, a preferred embodiment and best mode has been presented, the scope of the invention is not limited thereto, but rather is measured by the scope of the attached claims.

What is claimed is:

1. A process for restoring plastic laminate structures having unwanted void areas in the surface thereof comprising the steps of:
    cleaning the void areas preparatory to their filling;
    thereafter filling the void areas with patch materials; and
    applying protective topcoatings to the exposed surface of the fillings,
    wherein said cleaning comprises removing loose and adventitious material from said voids, and
    wherein said patch materials comprise (1) a member selected from the group consisting of vinyl acetate/acrylic copolymers, vinyl acetate homopolymers, and mixtures of vinyl acetate/acrylic copolymers with said vinyl acetate homopolymers, together with (2) inert mineral powders, and (3) color pigments; and
    wherein further, said topcoatings are polyurethane polymers.

2. A process according to claim 1 wherein said vinyl acetate homopolymers and said vinyl acetate copolymers are in the form of aqueous dispersions.

3. A process according to claim 2 wherein said patch material also contains an aqueous dispersion of a polyurethane polymer.

4. A process according to claim 1 wherein said patch material also contains a thickening agent.

5. A process according to claim 1 wherein the polyurethane polymer of said topcoating includes a cross-linking agent.

6. A process according to claim 1 wherein said member comprises a vinyl acetate homopolymer and a copolymer of vinyl acetate and n-methylol acrylamide.

7. A process according to claim 1 in which after cleaning the void areas, but prior to filling the void areas with patch material, the void areas are partially filled with a base layer of an epoxy resin.

8. A process according to claim 1 wherein in the case of restorations involving laminate structures having a surface which includes a decorative design therein, patch material of a desired color is reduced and is used to inscribe a matching design on the surface of the patch, after which said protective topcoating is applied.

9. A process according to claim 1 wherein said plastic laminate structures are formed by the high pressure lamination of melamine and phenolic plastics.

10. A process according to claim 1 wherein said inert material powder is a magnesium silicate hydrate.

* * * * *